Dec. 15, 1964     W. J. O'SULLIVAN, JR., ET AL     3,160,950
METHOD AND APPARATUS FOR SHOCK PROTECTION
Filed Jan. 17, 1962     2 Sheets-Sheet 1

INVENTORS
WILLIAM J. O'SULLIVAN, JR.
GEORGE F. PEZDIRTZ

BY

ATTORNEYS

INVENTORS
WILLIAM J. O'SULLIVAN, JR.
GEORGE F. PEZDIRTZ

United States Patent Office 3,160,950
Patented Dec. 15, 1964

3,160,950
METHOD AND APPARATUS FOR SHOCK PROTECTION
William J. O'Sullivan, Jr., Hampton, and George F. Pezdirtz, Newport News, Va., assignors to the United States of America as represented by the Administrator of the National Aeronautics and Space Administration
Filed Jan. 17, 1962, Ser. No. 166,970
22 Claims. (Cl. 29—423)
(Granted under Title 35, U.S. Code (1952), sec. 266)

The invention described herein may be manufactured and used by or for the Government of the United States of America for governmental purposes without the payment of any royalties thereon or therefor.

This invention relates generally to a method and apparatus for the protection of delicate instruments or the component parts thereof against vibration, acceleration and impact loadings, and other environmental hazards that might cause damage of the instrument or parts thereof while in transit. Such damage may be expected to ordinarily occur during shipment of the instrument on the Earth, during launch of the instrument into space as a payload item of a rocket booster vehicle, or upon impact with the surface of a celestial body following flight through space. More particularly, the invention involves embedding, or coating, entire instruments or delicate or sensitive parts thereof in a material having sufficient mechanical strength to adequately support, and thereby protect during transit, the instrument and its delicate parts; which material is capable of sublimating, melting, or dissolving after arrival of the instrument at the intended site of use, thereby releasing the instrument for immediate operation.

It is contemplated that in the near future space vehicles will be frequently landed on the Moon and other celestial bodies, and efforts are presently being commenced which will eventually lead to transporting and landing of human beings on the Moon and their safe return to Earth. Before it can be positively determined that man can survive for any appreciable length of time on the Moon, more information must be obtained regarding the physical properties of this body. Among the things that are unknown, at the present time, is the absence of, or presence and extent of, any physical transformation taking place on the Moon and it is desirable to acquire, among other data, seismometer studies of the lunar body. Seismometer studies of the Moon would aid in determining the physical properties and structure thereof, as well as give valuable information regarding measurements of gravity tides, tidal tilts and other long period disturbances. Although the capability of landing an unmanned space vehicle on the Moon surface exists, one of the critical problems that must be solved before such a venture can be considered practical is the provision of adequate protection for the instrumentation in such unmanned vehicle from the acceleration forces involved in launching, and the impact forces involved in landing, to thus permit these instruments to perform a useful function.

One presently known protective system for delicate instruments and parts thereof involves packaging the parts separately and reassembling the entire apparatus when ready for use. Obviously, this procedure cannot be followed in initial unmanned lunar surface exploration.

Another prior art system involves potting or embedding of electric circuits in thermosetting plastics and is used to maintain or package assembled delicate circuitry, but this arrangement is permanent and would be unsuitable where it is desirable to have subsequent movement between the parts.

Accordingly, an object of the present invention is the provision of a method of protecting delicate instruments against heavy acceleration loads, vibrations, and impact loads.

Another object of the instant invention is the provision of a time delay in the operation of an assembled device.

Still another object of the present invention is to provide protection for coacting surfaces in an assembled instrument prior to use thereof.

A further object of the instant invention is the provision of multiple solid protective coatings for sequential release of various components in an instrument.

A still further object of this invention is the provision of an easily removable potting material for the protection of machine components during transportation thereof.

An additional object of the present invention is the provision of a removable solid protective coating over at least a portion of one of two mating parts of a machine prior to use thereof.

Another still further object of the persent invention is to provide a novel packaging arrangement for delicate parts of an instrument.

Another additional object of the instant invention is the novel use of a removable solid material as a shock protector.

In accordance with the present invention, the foregoing and other objects are attained by potting or embedding the assembled instrument to be protected in a solid material which can be easily removed, by sublimation, when it is desired to place the instrument in use. Instead of, or in addition to, totally embedding the instrument in a protective solid, it is sometimes desirable to embed individual delicate parts thereof in the solid removal material, either entirely or in part, prior to assembly of the device. This local embedding proves advantageous where extreme shocks are anticipated, and can further provide an effective time delay in operation, for example, when applied to clockwork mechanisms. The class of polymers called polyoxymethylenes have proved particularly suitable for potting or embedding of delicate instruments since they possess a high degree of mechanical strength, can be easily decomposed by heat or photo-oxidation for removal, and leave only the gas formaldehyde as a residue when decomposed. Polyoxymethylenes form a family of numerous compounds composed of repeating units of $(-O-CH_2-)_x$, wherein "$x$" can be any integer from one up to several thousand. Other suitable embedding or potting materials particularly suitable in space exploration include polyalphamethylstyrene and polymethylmethacrylate.

A more complete appreciation of the invention and many of the attendant advantages thereof will be readily appreciated as the same becomes better understood by reference to the following detailed description when considered in conection with the accompanying drawings wherein.

Figure 1:
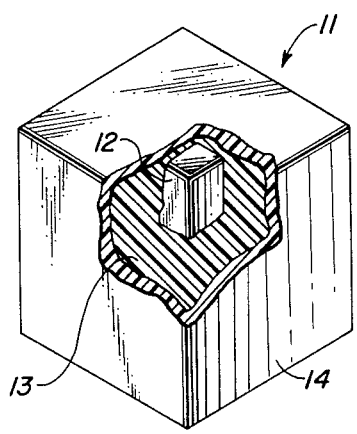
FIG. 1 is a perspective view, with parts broken away, of an instrument package embedded within a solid sublimating material.

Referring now to the drawings wherein like reference numerals designate identical or corresponding parts throughout the several views, and more particularly to FIG. 1, a package configuration, generally designated by the referenced numeral 11, is shown containing instrumentation 12 completely embedded or potted within a solid decomposable material 13 positioned within an outer removable casing 14. Casing 14 may also consist of a decomposable material, as will be more completely explained hereinafter. Instrumentation 12 may include, among other things, radio and television equipment, radar equipment, spectrometers, seismometers, magnetometers, penetrometers, chemical analyzers, gravimeters, radiation detectors, micrometeoroid detectors; pressure, temperature, and ionization gages; sound detectors and analyzers, etc. During the embedding or potting process, material 13 will contact any exposed movable parts of instrumentation 12 and completely immobilize these parts until subsequent removal of material 13.

Figure 2:
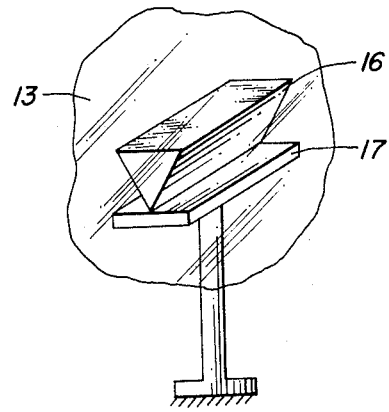
FIG. 2 is a schematic view of a pair of delicate coacting parts of a sensitive instrument embedded within a solid sublimating material.

Referring now to FIG. 2, the individual delicate parts of a typical piece of equipment may be protected as shown, for example, by potting or embedding the assembled device in its operative position. For example, knife edge 16 of an instrument is shown potted in material 13 for external shock protection in operative contact with its seat 17.

Figure 3:
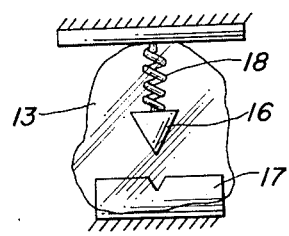
FIG. 3 is a schematic end view of a pair of delicate coacting parts of a sensitive instrument maintained spaced from each other by a solid sublimating embedding material.

An alternative embodiment of a knife edge assembly is shown in FIG. 3 in which knife edge 16 is maintained spaced from its seat 17 by embedding material 13. Upon sublimation of material 13, knife edge 16 will move under the influence of weak spring 18 into operative contact with seat 17.

Figure 4:
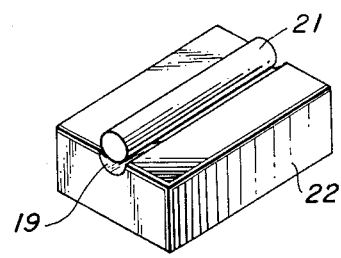
FIG. 4 is a perspective view of an instrument part only partially embedded within a solid sublimating protective material.

Referring now to FIG. 4, less delicate parts, such as roller bearing 21 and its seat 22, requiring only limited protection are shown. A local protective coating or mass of embedding material 19 is shown between the coacting surfaces of bearing 21 and seat 22. Local protective material 19 may be provided on either or both of the coacting surfaces of bearing 21 and seat 22 prior to, or after, assembly of the instrument, as so desired.

In addition, where an entire instrument is substantially rugged, or does not require special localized embedding of delicate parts, sufficient protection is afforded by applying the solid protective embedding material to the external housing of the assembled device without contacting the individual, internally disposed, instrument parts. The minimum thickness required for the protective solid in a particular situation will vary according to the degree of protection needed for each instrument and the environmental conditions under which the instrument is to be transported and used.

Figure 5:
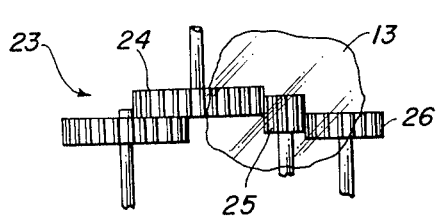
FIG. 5 is a schematic view of a further application of the invention as applied to a clockwork gear train; and, FIG. 6 is a partial perspective view of an assembled seismometer, with parts omitted for clarity, completely embedded within a solid sublimating protective material.

The invention also is applicable to effect time delay in operation or use of a particular instrument. Referring now to FIG. 5, for example, a portion of a clockwork gear train, generally designated by reference numeral 23, is shown with intermeshing gears 24, 25, and 26 immobilized by embedding material 13. Embedding material 13 may be used to embed only one tooth of one gear, the entire gear assembly, or any portion therebetween, depending upon whether only a time delay in operation is desired or whether a substantial degree of protection against shocks is needed as well.

Figure 6:
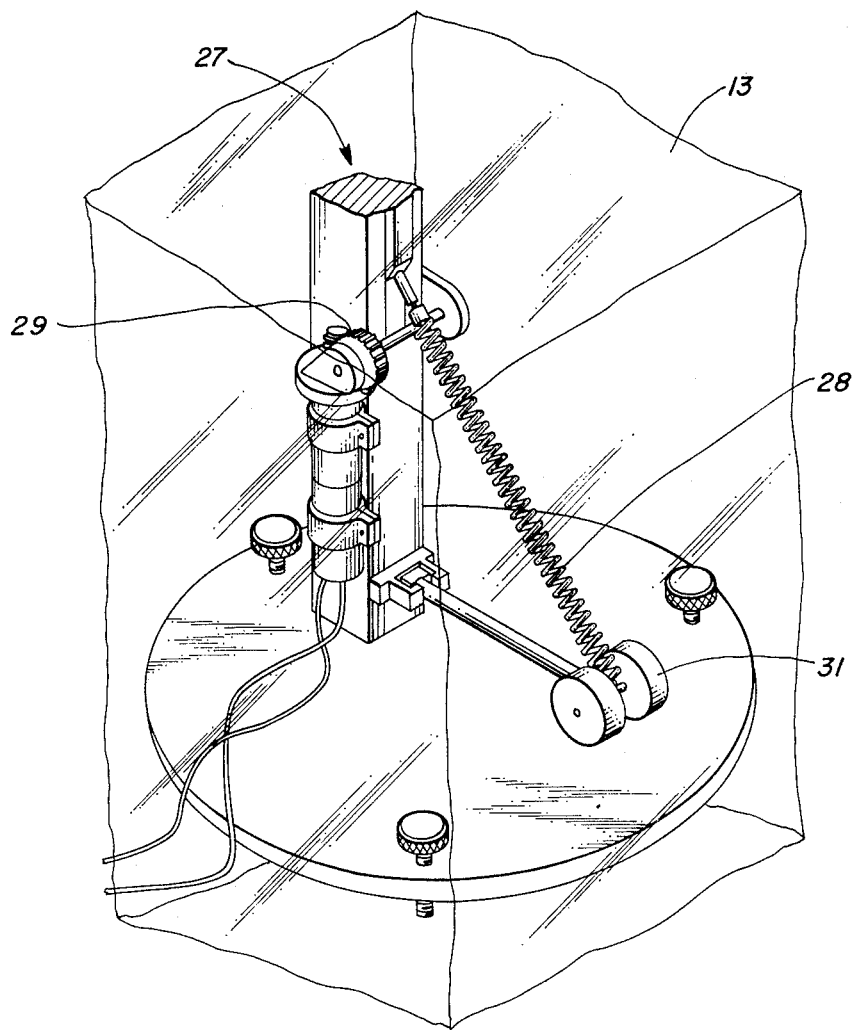

Referring now to FIG. 6, the delicate parts of an exemplary particular type seismometer, shown generally by reference numeral 27, are protected against shock forces by completely embedding the assembled structure in a protective sublimating solid 13. The coils of spring 28, gear assembly 29 and weight 31 of seismometer 27 are completely embedded in protective material 13, thereby effectively immobilizing all movable parts until subsequent removal of protective material 13.

On occasion, it may also be desirable to employ one decomposable material for the localized embedding of individual instrument parts, the same or another material to embed the entire instrument, and possibly still another material as an external protective layer. For example, instrumentation 12 of FIG. 1 could include clockwork 23 of FIG. 5, the bearings of which could be locally embedded as shown at 19 in FIG. 4, the gears embedded as shown in FIG. 5, the entire instrument embedded as in FIG. 1 in one protective material 13 and a further protective decomposable material 14 used to embed the entire mass. Material 14 may, for example, and as further explained hereinafter, be a chemically blocked material which requires special external treatment such as, for example, the application of excess heat to initiate decomposition thereof, where maximum and stable protection over a period of time is required. When employing this type of arrangement in a space satellite or interplanetary vehicle, the package is so positioned as to be protected from heat until it is desired to expose the protected instrument or instruments. This protection from heat until it is desired to expose the instrument package may be accomplished in numerous ways such as, for example, positioning the protected instrument package adjacent a heat shield or other protective structure that is jettisoned, before impact of the vehicle with the surface of a celestial body, following flight through space.

It is also within the scope of this invention to arrange for sequential release of various parts of an instrument or individual members of an instrumentation system by the selection and positioning of particular embedding materials. Also, although the final packaged configuration is shown as cubical in FIG. 1, obviously, it can be of any regular or irregular shape desired and can thus be made to conform to any internally disposed space within a vehicle.

The embedding material required for protection of instruments and instrument parts according to the present invention must obviously have sufficient mechanical strength to afford adequate protection, while still being readily workable so as to fully enclose the instrument parts to provide adequate support. Various methods of applying the protective embedding material or coating are obvious to those skilled in the art and include casting or potting, successive layers applied by dipping, spraying, and painting or plastering the material in place. Also, the embedding material must be capable of being easily, and in some cases remotely, removed from the instrument when it is desired to place the instrument into operational condition; which means the embedding material must undergo the physical change of sublimation, evaporation, melting or disintegration.

The removal by sublimation, or the conversion of the solid embedding material directly into a gas, appears best suited for space exploration because it leaves no solid or liquid residue and is operational in any attitude or altitude since this process is not dependent upon a gravitational or centrifugal force field and, thus, is particularly suitable for use in earth satellites and spacecraft. The process of sublimation is an endothermic reaction and therefore requires a source of heat energy although the amount of heat per unit of mass of embedding material is small and varies with individual materials. The source of heat required may be obtained from sunlight, by thermal conduction or radiation from warm objects; and the rate of sublimation is governed only by the rate of acquisition of heat by the material and the rate of escape of the gaseous product. Sublimating materials are particularly suitable for protective use in space or on the moon because of the surrounding spatial vacuum into which gaseous products can escape freely.

Solids that melt or pass from the solid state into a liquid, are suitable for embedding materials only where retention of the liquid surrounding the parts may be acceptable, but in most cases the liquid must be removed, which requires, in general, evaporation of the liquid, as well as fluid run-off under the influence of a gravitational or a centrifugal force. Thus, for use in earth satellites and space vehicles, protective embedding materials that can be removed only by melting are not generally satisfactory.

Solids capable of disintegration or breaking up into a fine granular state or a powder are also not as suitable for protective materials as those that sublimate but may, in some instances, be employed where the powder residue is not objectionable, or can be readily removed.

Each instrument to be protected by embedding presents special problems and requires individual treatment. For example, instruments that employ bearings of one form or another require different treatment from that afforded television and radio equipment, clockwork mechanisms, voltmeters, ammeters, analytical balances, or seismometers. General or total embedding may not provide adequate protection of delicate or sensitive components such as, for example, spiral springs, the knife edge of analytical balances and seismometers, or jeweled bearings and, accordingly, special local embedding of these parts is essential. That is, the mating or coacting parts desired to be protected are installed after embedding, or coating, a portion or the entire body of one or both of the coacting elements in such position that upon removal of the embedding material the parts will move automatically into their normal operating position. Also, where desired, an external actuating force such as, for example, spring 18, FIG. 3, may be used with or without suitable guides to position the protected elements as the protective medium is removed.

In addition, in selection of embedding materials for specific instruments, the physical and chemical compatibility of the embedding material in relation to the materials of the instrument must be carefully considered. For example, there must be no adverse chemical reaction between the embedding material and the parts protected, during the embedding process, while embedded, or during the removal process. There must also be no substantial degree of expansion or contraction of the embedding material during the aforementioned conditions imposing loads on the embedded parts that would deform these parts or otherwise effect subsequent accurate operation thereof. It is for this reason that local embedding or coating at selected points may at times prove desirable, alone, or in adidtion to, total embedding of an instrument.

All of the desirable characteristics of an embedding material discussed hereinbefore, namely, high mechanical strength, capability of being easily removed to free the protected instrument, and having only a gaseous residue, are found in the class of polymers called polyoxymethylenes. This class of polymers has in the chemical structure thereof the repeating unit $(-O-CH_2-)_x$, wherein "$x$" can be any integer from one to several thousand. These polymers form a family of numerous compounds of which paraformaldehyde and symtrioxane are examples. Both of these compounds decompose rather easily to yield the gas formaldehyde whose boiling point is approximately $-19.5°$ C. under one atmosphere pressure. Paraformaldehyde and symtrioxane may be considered as low molecular weight polymers of formaldehyde, and in the case of symtrioxane there are only three repeating units. Symtrioxane sublimes at $46°$ C. under one atmosphere pressure and thus can be readily removed without the application of great heat. Also, since trioxane melts at $64°$ C., it may be cast, sprayed or painted to embed most instruments without damage to the instrument parts due to excess heat.

Since the melting point and sublimation temperature of a given material are known to be functions of molecular weights, within known limits, it is possible to adjust the melting point and sublimation temperature to that desired or required, within these limits, for any specific application by proper choice of the number of repeating units in the embedding compound. The polyoxymethylene polymers may be decomposed or sublimated with heat, photo-oxidation, or hydrolysis, or any combination thereof, and sublimation of a protective embedding material composed of a polyoxymethylene landed on the Moon may be readily effected by the available high vacuum, heat, strong ultraviolet radiation, or a combination thereof.

Also included in the polyoxymethylene polymers is the commercially available plastic called Delrin, which is a product of E. I. duPont de Nemours, Inc. and which consists of a chemically blocked polyoxymethylene essentially made up of repeating units of formaldehyde. This particular plastic has exceptional mechanical properties in strength, rigidity and durability, and is replacing metal in such parts as gears, bearings, pumps, etc., in numerous mechanical applications. Delrin is a linear polymer composed of approximately 1000 repeating units of formaldehyde and thus has a molecular weight in the range of 30,000. This material has been made commercially possible through control of decomposition by chemically blocking the ends of the polymer chains; wihout which blocking the polymer readily decomposes or sublimates. Although Delrin is quite stable under normal conditions encountered on Earth it may be readily decomposed when exposed to extreme heat, strong ultraviolet radiation and high vacuum; and thus would be easily removed, upon encountering these conditions on the Moon, when employed as a protective embedding material for instruments landed on this body. Room temperature solvents for Delrin, which will dissolve this blocked polyoxymethylene, as well as dissolve unblocked and partially blocked polyoxymethylene of intermediate molecular weights, are commercially available and thereby permit application of these polymers to instruments and instrument parts by conventional coating and embedding processes.

It has further been determined that the mechanical properties of Delrin, and of the other polyoxymethylenes, are not derived from the blocking of the polymer chains but rather from the intermolecular or secondary valence bonding between the molecular chains. Accordingly, unblocked or partially blocked polyoxymethylenes of intermediate molecular weight of the order of 500 to 10,000 provide sufficient mechanical strength for most conceivable short period embedding processes; although partially blocked, or unblocked polyoxymethylenes having molecular weights up to 100,000 may also be desirable under some unusual expected environmental conditions.

Obviously, when using a chemically blocked polyoxymethylene such as Delrin, or a partially blocked polyoxymethylene, as the protective embedding material, greater protection is afforded the protected instrument, and more extreme conditions are required to effect removal of the embedding material, than found for an unblocked polymer. For example, Delrin will start to decompose in approximately fifty minutes when heated at $400°$ F. and, if the temperature is increased to $480°$ F. sublimation starts in approximately eight minutes; while, as mentioned heretofore, symtrioxane sublimates readily at $46°$ C., or approximately at $115°$ F. Under most conditions, however, and particularly where no time delay is necessary or desirable, it is sufficient to employ an unblocked polyoxymethylene, the maximum molecular weight of which, within limits, depends upon the strength and time requirements for the needed protection. Also, if desired, an initial coating of an unblocked polyoxymethylene may be applied to the instrument to be protected, and a relatively thin protective coating of a blocked polyoxymethylene subsequently applied therearound. When employing this embodiment of the present invention, the time requirement for removal of the blocked material is quite small and any minute removal thereof will expose the inner or less stable coating or embedding material and permit rapid and sequential decomposition or sublimation thereof.

Other polymers possessing excellent characteristics for embedding instruments, and particularly suitable for decomposition under the conditions encountered in space exploration, are polyalphamethylstyrene and polymethylmethacrylate.

Obviously, numerous modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Apparatus for protecting during transit from one site to a site of use an assembled sensitive instrument having at least a pair of delicate components normally positionable in contacting, relatively movable, operative relationship, comprising: a first solid decomposable embedding material maintaining the instrument inoperative by retaining the members of said pair of delicate components out of operative contacting relationship, and a second solid decomposable material completely encasing the entire assembled instrument, said first and said second decomposable materials having the physical property characteristics of being changeable from their solid state to a flowable state upon exposure thereof to a selected ambient condition that may exist at said site of use to thereby automatically release said delicate components and place the instrument in operative condition by permitting the contacting engagement and subsequent operative relative movement of said delicate components.

2. Apparatus according to claim 1 wherein said first and second solid decomposable materials are of the same chemical composition.

3. Apparatus according to claim 1 wherein said first and second solid decomposable materials are of different chemical compositions.

4. Apparatus according to claim 1 wherein said second solid decomposable material has the physical property characteristic of sublimating prior to decomposition of said first solid decomposable material.

5. Apparatus according to claim 1 wherein said second decomposable material is a chemically blocked polyoxymethylene.

6. Apparatus for protecting parts of an assembled sensitive instrument wherein at least one of the parts must undergo movement when operative, comprising: a solid decomposable material immobilizing said one part spaced from its operative position, said material having the physical property characteristic of sublimating under predetermined conditions to permit subsequent automatic movement of said one part to thereby place said instrument in operating condition.

7. Apparatus according to claim 6 including resilient means positioned adjacent said one part to accomplish the automatic movement of said one part to operative position.

8. Apparatus according to claim 7 wherein said resilient means is also embedded in a protective coating of a solid decomposable material.

9. Apparatus according to claim 8 wherein said decomposable material protecting said resilient means has the physical property characteristic of sublimating prior to the sublimation of said decomposable material immobilizing said one part, whereby an actuating force will be uniformly applied to said one part toward its operative position simultaneously with sublimation of said decomposable material maintaining said one part immobile.

10. Apparatus according to claim 6 wherein said solid decomposable material is a polyoxymethylene.

11. Apparatus according to claim 6 wherein the entire instrument is embedded within said solid decomposable material.

12. A method of protecting individual components of an assembled machine during transit from a first site to a site of use, comprising: spacing individual coacting assembled machine elements away from each other, embedding at least a portion of at least one of said spaced elements within a solid sublimating compound and, assembling the embedded portion of said one element out of operative position a distance at least equal to the thickness of said sublimating compound, in such manner that said one element will automatically become operative with said other element upon sublimation of said sublimating compound.

13. A method of protecting machine components according to claim 12 wherein the entire element to be protected is embedded within a sublimating compound.

14. A method of protecting machine components according to claim 12 and further including the step of embedding at least the contact surface of both said coacting elements with a sublimating compound.

15. A method according to claim 12 wherein said sublimating compound is a polyoxymethylene.

16. A method according to claim 15 wherein said polyoxymethylene has an approximate molecular weight of 30,000.

17. A method according to claim 15 wherein said polyoxymethylene is chemically blocked to prevent untimely sublimation thereof.

18. A method of protecting the individual sensitive components of an assembled instrument during transportation thereof, comprising the steps of: maintaining individual relatively movable coacting sensitive components of the instrument in spaced apart inoperative and relatively immobile position by means of a solid chemically blocked polyoxymethylene and, inducing sublimation of said solid chemically blocked polyoxymethylene by the application of heat to automatically place said components in operative position when it is desired to use the instrument.

19. An article of manufacture comprising: in combination with a sensitive instrument having relative movable parts when in use and adapted to be transferred from one site to a site of expected use, a solid body completely enveloping and protecting said instrument and confining the movable parts thereof against temporary movement relative to one another, said solid body being formed of a material having the physical property characteristic of changing its form from its solid state to a flowable state upon its exposure to a selected ambient condition that may exist at said site of expected use to thereby automatically release the confined movable instrument parts and render said instrument operative.

20. The method of protecting an assembled instrument having functionally cooperating, relatively movable, parts from damage during its transit from one site to a site of proposed use, which comprises: confining said parts in a selected immovable relationship to one another with a solid material having the physical property characteristic of automatically changing from a solid state to a readily flowable state when exposed to the combination of high vacuum, high temperature and ultraviolet radiation ambient conditions that may exist at the said site of use, to thereby automatically release said parts and permit subsequent relative operative movement thereof.

21. The method of protecting an instrument, having assembled cooperating parts that are relatively movable in use, from damage due to shock and vibrations encountered during its transit from one site to a site of proposed use which comprises, enveloping said assembled parts, prior to transit, in a first material that as applied assumes a solid state and confines said parts in a selected relationship against movement relative to one another, said first material having the physical property characteristic of being changeable from said solid state to a flowable state upon its exposure to a selected ambient condition that may exist at said site of use, embedding the resulting structure in a second material that assumes a solid state and serves as a housing for the assembled instrument, said second material being a chemically blocked polyoxymethylene having a molecular weight of approximately 30,000 with the inherent physical property characteristic of being changeable from the solid to a flowable state upon its exposure to a selected ambient condition that may exist at said site of use, said first material being exposed to the ambient condition at said site of use only after said second material has undergone a change from a solid to a flowable state, said first material upon being changed from the solid to a flowable state automatically releasing the confined parts for relative movement to thereby place the instrument in operative condition.

22. The method of protecting an instrument, having cooperating parts relatively movable when in use, from damage during its transit from one site to a site of proposed use, which comprises: applying to said parts prior to transit an immobilizing material which, as applied, assumes a solid state and confines said parts in a selected relationship against movement relative to one another, said immobilizing material also having the physical property characteristic of automaticaly changing from its said solid state to a flowable state upon free exposure to a selected ambient condition that may exist at said site of use to thereby automatically place the instrument in operative condition.

References Cited by the Examiner

UNITED STATES PATENTS

| | | | |
|---|---|---|---|
| Re. 24,767 | 1/60 | Simon et al. | 206—46 |
| 2,952,878 | 9/60 | Swerlick et al. | 260—67 |
| 3,000,402 | 9/61 | Bowman | 206—46 |
| 3,000,861 | 9/61 | Brown et al. | 260—67 |
| 3,003,656 | 10/61 | Hardigg | 206—46 |
| 3,040,879 | 6/62 | Planitizer | 206—46 |
| 3,048,267 | 8/62 | Starzec | 206—46 |

WHITMORE A. WILTZ, *Primary Examiner.*

RICHARD D. NEVIUS, THOMAS H. EAGER,
*Examiners.*